United States Patent [19]
Forman

[11] Patent Number: 5,477,427
[45] Date of Patent: Dec. 19, 1995

[54] REFLECTOR LIGHT WITH ELECTRIC LAMP FOR BICYCLES

[76] Inventor: Edward P. Forman, 1230 Honey Lake Rd., Lake Zurich, Ill. 60047

[21] Appl. No.: 355,033

[22] Filed: Dec. 13, 1994

Related U.S. Application Data

[63] Continuation-in-part of Ser. No. 230,896, Apr. 21, 1994, abandoned.

[51] Int. Cl.⁶ .................................................. B62J 6/00
[52] U.S. Cl. .................................... 362/72; 362/77
[58] Field of Search .......................... 362/72, 78

[56] References Cited

U.S. PATENT DOCUMENTS

| | | |
|---|---|---|
| 3,947,070 | 3/1976 | Brilando . |
| 4,037,924 | 7/1977 | May . |
| 4,201,448 | 5/1980 | Kagayama . |
| 4,796,972 | 1/1989 | Thomas . |
| 4,878,734 | 11/1989 | Trebnick . |
| 5,278,732 | 1/1994 | Frankum . |
| 5,283,547 | 2/1994 | Leon . |
| 5,333,101 | 7/1994 | McEvoy . |

*Primary Examiner*—Ira S. Lazarus
*Attorney, Agent, or Firm*—Leydig, Voit & Mayer

[57] ABSTRACT

A self-contained illuminated reflector device for mounting to the spoke of a wheel includes a housing having a spoke receiving slot for mounting the reflector to the spoke, and a cavity included in the housing; mounted within the cavity are a fiber-optic light bulb and a battery holder which is electrically connected to the light bulb, and is adapted to receive a battery for selectively providing current to the light bulb.

8 Claims, 5 Drawing Sheets

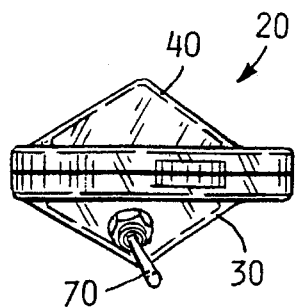
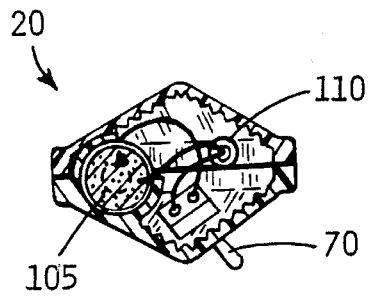
FIG. 6    FIG. 7
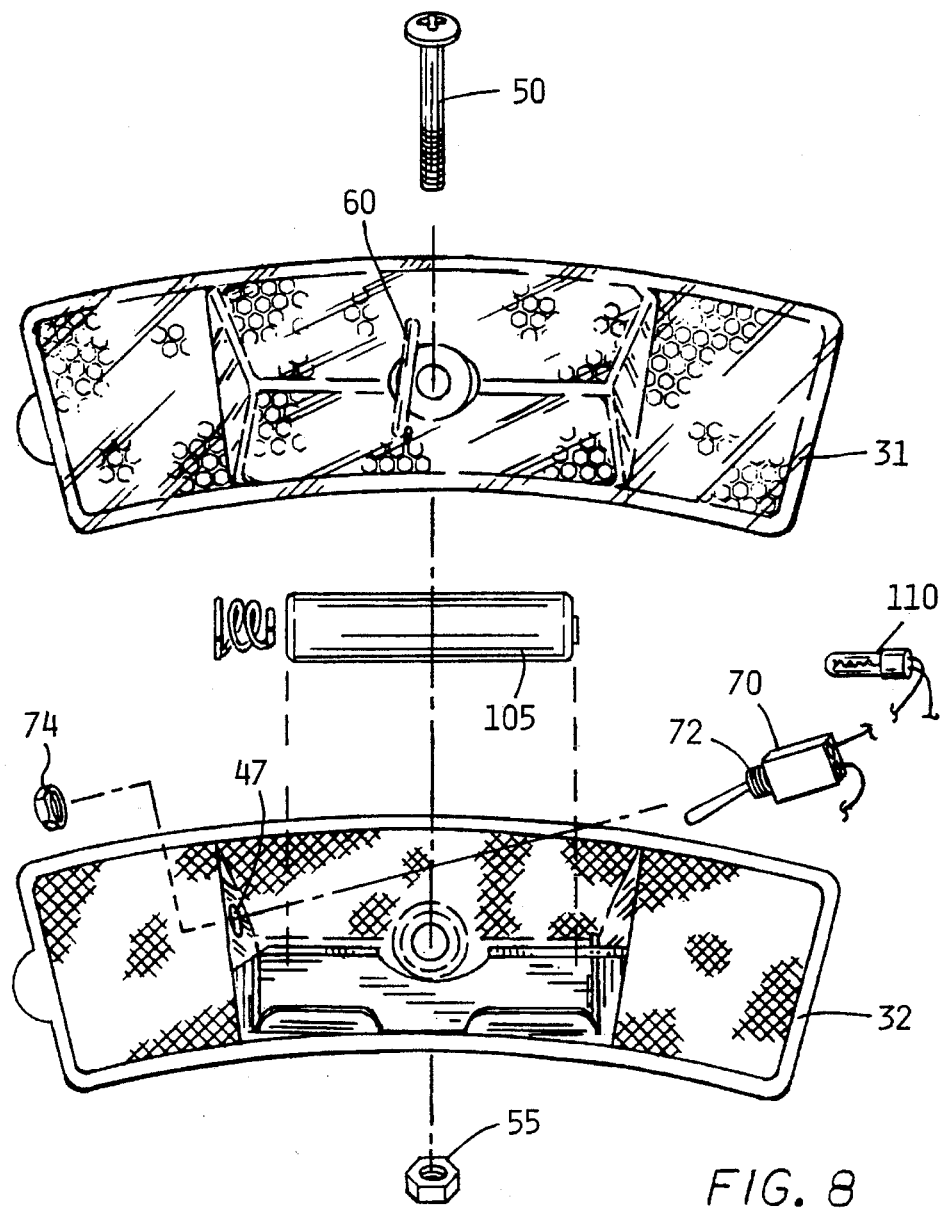
FIG. 8

REFLECTOR LIGHT WITH ELECTRIC LAMP FOR BICYCLES

RELATED APPLICATION

This application is a continuation in part of my application Ser. No. 08/230,896 filed Apr. 21, 1994 and now abandoned.

FIELD OF THE INVENTION

The present invention relates generally to illumination devices, and more particularly to an improved, self-contained illuminated spoke-mounted reflector for bicycles.

BACKGROUND OF THE INVENTION

Varies types of reflector and lighting devices are available for attachment to bicycles. These various devices have been developed to provide a degree of safety for bicycle riders after dark. Generally, these devices are attached either to the bicycle wheel or to the frame of the bicycle itself. However, purely reflective devices are limited in utility in that they depend upon available lighting for operation, and do not afford sufficient illumination to enable the bicycle to be seen at significant distances by, for example, an automobile driver. Thus these widely used devices may not always offer the maximum amount of safety.

In order to enhance the safety of purely reflective devices, various techniques have been attempted. For example, U.S. Pat. No. 4,878,734 discloses a bicycle reflector attachment that is rotated with and by rotation of the bicycle wheel. The rotating motion of the reflector presents a rotating or flashing pattern of light to on-coming traffic. As can be seen from reference to that patent, however, while the reflector system may provide for enhanced safety, the device itself is cumbersome and bulky. The added bulk and size of the reflector could, under certain circumstances, itself offer a danger to the bicycle rider.

In other attempts to enhance the safety characteristics of bicycle-mounted reflector devices, powered bicycle lights have been used. Typically, such powered lights are mounted somewhere on the frame of the bicycle, and rely upon a generator mounted both to the hub and to the wheel to generate electric current to power the light. In the alternative, other patents have shown spoke-mounted lights which derive their power from similar hub and wheel mounted generators. Any such lights, relying upon wheel mounted generators for power, are subject to the disadvantage of numerous moving parts to generate electricity in addition to the need for wires, or other means for conveying electricity, to be carried on the bicycle. The presence of such wires can be dangerous in certain situations, and wires are typically subject to wear, thus requiring replacement on a periodic basis. Certain other prior devices have attempted to replace the wheel mounted generator with a simple battery mounted to the bicycle frame. Of course, use of a dry cell mounted to the frame adds weight and bulk to the bicycle, and does not eliminate the need for wires or other means of conveying electricity to the light bulbs mounted in the bike lights.

Thus, existing reflector devices for mounting on bicycles offer limited safety features. Purely reflective devices depend upon the light from outside sources for operation, and do not afford sufficient illumination at great distances. Powered light devices have the disadvantage of several moving parts, and the need for undesirable wires or other means for conveying electricity to the various components.

SUMMARY OF THE INVENTION

Accordingly, it is a primary aim of the present invention to overcome the disadvantages and drawbacks of bicycle reflectors and lights that have been discussed above.

In accordance with that aim, it is the primary object of the present invention to provide a compact, self-contained bike light for mounting on the spokes of a bicycle wheel including the actual light and the power means.

It is a related object of the invention to provide a bike light which does not require any exterior wiring or other means for conveying electricity.

A further related object is to provide an illuminated bike reflector that does not require an outside power source.

A further object of the invention is to provide an illuminated reflector device of low weight and dimension so as to prevent its presence on the wheel from causing a wheel imbalance.

A further object of the invention is to provide an illuminated reflector device for bicycles that is simple to manufacture, and simple for the user to assemble and service.

In accordance with these and other objects of the invention, there is provided an illuminated reflector device for mounting to a spoke of a wheel which is self-contained. The reflector device includes a housing which, in turn, includes a spoke-receiving slot for mounting the reflector to the spoke. A cavity is included within the housing. Mounted within the cavity are a fiber-optic light bulb and a battery holder. The battery holder is electrically connected to the light bulb, and is adapted to receive a battery for selectively providing current to the light bulb. Since the cavity is sized to receive the battery, the connection to the light bulb, and the light bulb, the entire illuminated reflector is both compact and self-contained.

Other objects and advantages of the invention will become apparent from the following detailed description and dependent claims, and upon reference to the accompanying drawings, wherein:

BRIEF DESCRIPTION OF THE DRAWINGS

FIG. 6 is an elevational side view of an illuminated reflector according to an embodiment of the invention;

FIG. 7 is a sectional view taken along the line 7—7 of FIG. 4;

FIG. 8 is an exploded view of an illuminated reflector according to an embodiment of the invention;

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
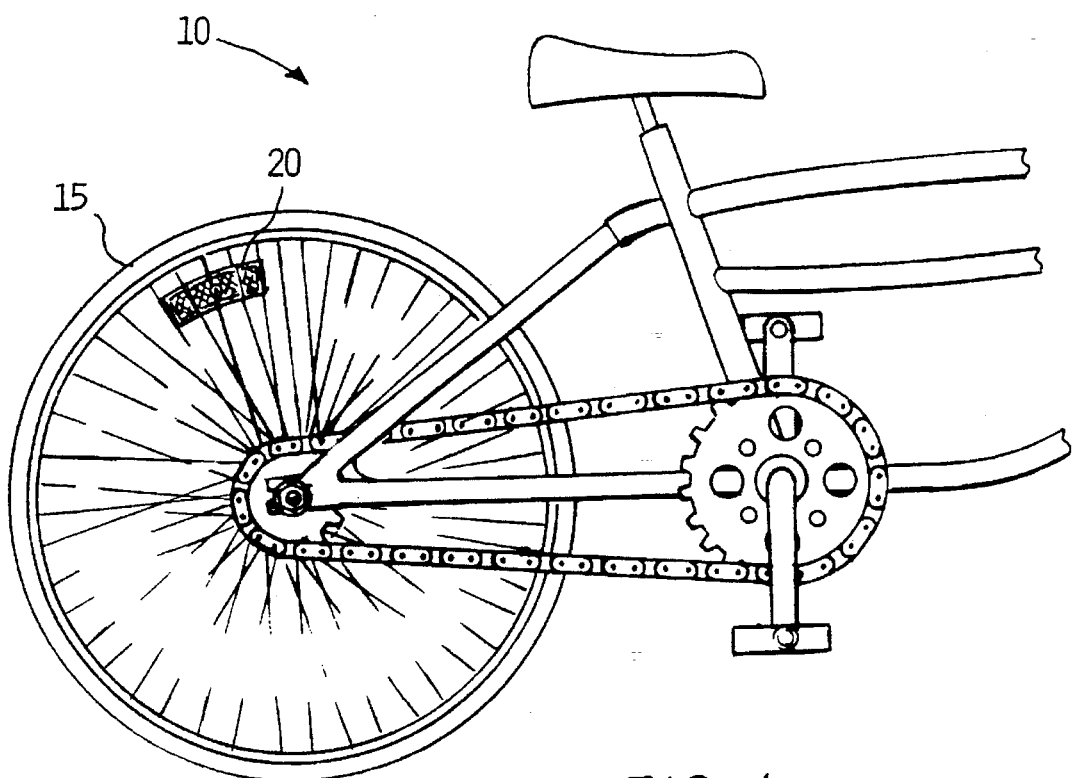
FIG. 1 is an elevational view showing the bicycle wheel environment for an illuminated reflector according to one embodiment of the invention.
Figure 2:
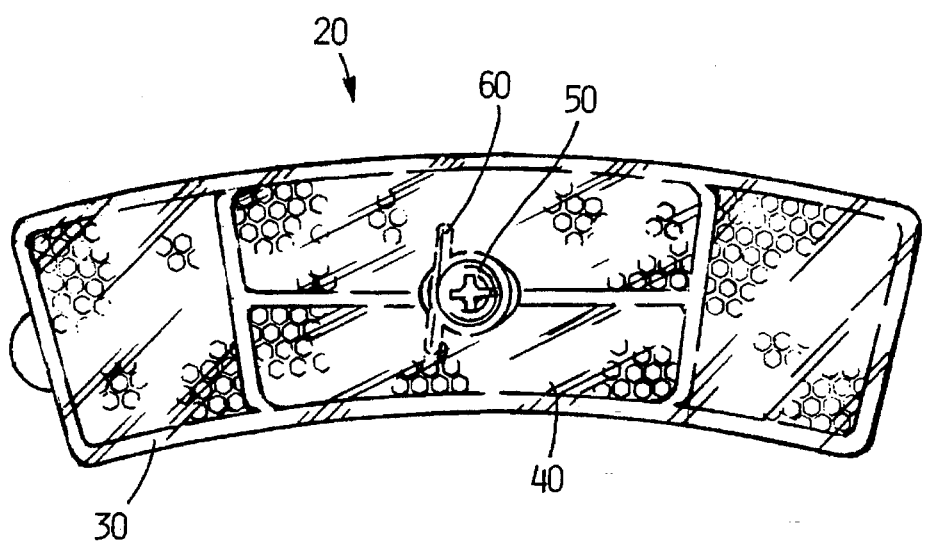
FIG. 2 is a front view of an embodiment of the illuminated reflector according to the invention.

Turning now to the drawings, in FIG. 1, there is shown a bicycle 10 with an illuminated reflector 20 mounted to a spoke on the rear wheel 15 of the bicycle 10. As can be seen from that figure, the reflector 20 is compact and does not take up an undue amount of space on wheel 15. An elevational top view of the reflector 20 can be seen in FIG. 2. Illuminated reflector 20 includes a housing 30 which takes the shape of an arc which essentially matches the arc of the wheel to which the illuminated reflector 20 will be attached. As will be discussed in greater detail below, housing 30 is comprised of front and rear sections of similar shape and dimension. It can be further seen from FIG. 2 that the housing portion 30 of the illuminated reflector includes retro-reflective surfaces. According to this embodiment these retro-reflective surfaces are the internal surfaces of the two sections of housing 30. Centrally disposed on housing 30 is an expanded cavity portion 40. The cavity portion can be seen most clearly in reference to FIG. 4. As can be seen in that figure, the cavity portion extends away from the remainder of the surface of the housing 30. The function and contents of cavity portion 40 will be discussed in greater detail below. Returning to FIG. 2, cavity portion 40 includes a central opening 45 for receiving a screw 50. Adjacent to the central opening 45 for receiving the screw 50 is a spoke receiving groove 60. When the illuminated reflector 20 is attached to a bicycle spoke, the spoke rests within spoke-receiving groove 60. The spoke is then clamped between screw 50 and spoke-receiving groove 60 to secure the illuminated reflector 20 in place.

Figure 3:
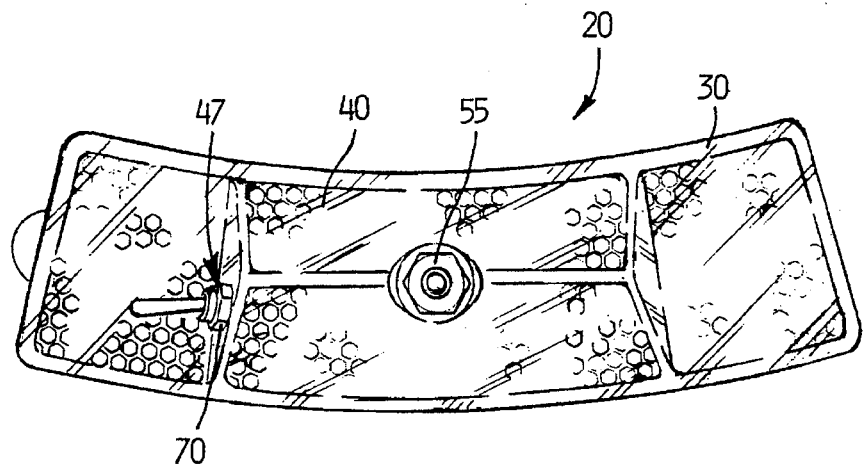
FIG. 3 is an elevational rear view of an illuminated reflector according to an embodiment of the invention.

A rear elevational view of the illuminated reflector 20 is shown in FIG. 3. Again, the reflector includes a housing portion 30 and a cavity portion 40. From this rear view, it can be seen that the cavity portion 40 also includes a depression for receive a nut 55. The nut is received on the threaded end of screw 50 as can be seen most clearly in FIG. 4. With the screw 50 and nut 55 in place, and the spoke of the bicycle wheel residing in spoke-receiving groove 60, the illuminated reflector 20 is held in place on the bicycle. Returning to FIG. 3, it can be seen that the cavity portion 40 includes a mounting hole 47 for receiving a switch 70. The switch 70 allows selective activation of the powered-light portion of the illuminated reflector 20.

Figure 4:
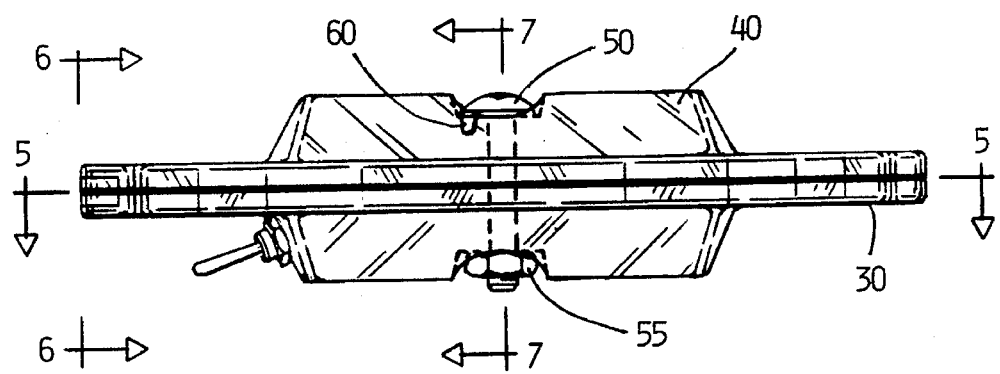
FIG. 4 is an elevational top view of an illuminated reflector accordingly to an embodiment of the invention.

The top view of FIG. 4 shows the cavity portion 40 of the illuminated reflector 20 in more detail. The cavity portion 40 extends away from the flat surface of the housing 30. As can be seen in FIGS. 6 and 7, the side walls of the cavity 40 are angled, and meet at a single line running the length of the cavity 40. Returning to FIG. 4, it can be seen that cavity 40 provides a volume in which other components of the illuminated reflector 20 can be mounted. At the same time, it is seen that cavity 40 has a low profile thus allowing cavity 20 to have the desired functional characteristics, while not having unduly large dimensions.

Figure 5:
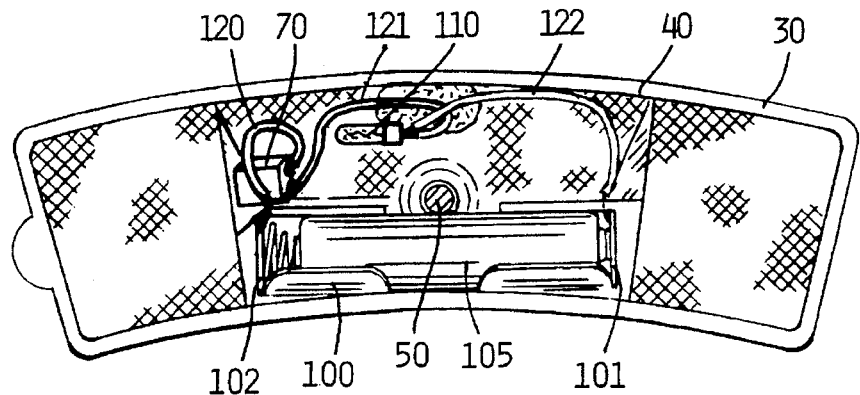
FIG. 5 is a sectional view of the illuminated reflector taken along the section lines 5—5 shown in FIG. 4.

The components which are housed in cavity 40 are shown in their respective positions in the sectional view of FIG. 5. These components include a battery holder 100, a battery 105, a fiber-optic light bulb 110, switch 70 and wires 120, 121, and 122. Battery holder 100 is illustratively epoxied in place in cavity 40. Attached to the battery holder are a contact 101 and a spring-contact 102 for making connections to the positive and negative terminals of the battery 105. With the switch 70 activated, current flows from the battery to the fiber-optic light bulb 110, which illuminates. A "AAA" battery holder and battery are illustrated, although other batteries could be used. The light from fiber-optic bulb 110 passes through the retro-reflective surfaces of the cavity 40 to give a constantly-lit, highly visible light source on the bicycle wheel. It can also be seen from FIG. 5 that the arrangement of components within cavity 40 provides clearance for passage of the screw 50 through the cavity. The arrangement of the various components can also be seen in the side-sectional view of FIG. 7. Again, it can be seen that the arrangement of components within cavity 40 allows illuminated reflector 20 to have its advantageous functional features, while maintaining a low profile and small size.

FIG. 8 shows an exploded view of the illuminated reflector 20 according to this embodiment of the invention. As can be seen from that drawing and as previously discussed, the housing 30 is comprised of two similarly-shaped portions 31 and 32. Upon removal of screw 50 by loosening bolt 55, reflector 20 can be removed from the spoke and the two portions 31 and 32 can be separated. This provides for changing of the battery at the end of its lifetime. Further, such disassembly allows the bike light to be effectively cleaned. FIG. 8 also shows switch 70 more clearly. It can thus be seen that switch 70 includes a threaded region 72 which fits through receiving hole 47 in back portion 32 of the illuminated reflector. A nut 74 holds the switch 70 in place on portion 32. Once the components are in place within cavity 40, the two portions 31 and 32 are placed together. The illuminated reflector 20 is then positioned with a spoke of the bicycle in the spoke-receiving slot 60. Screw 50 is threaded through its receiving hole, and bolt 55 is screwed onto the threaded portion of screw 50. As a result of this operation, the illuminated reflector 20 is held in position on a spoke of the bicycle wheel, as shown in FIG. 1, and is ready for activation by operation of the switch 70.

Figure 9:
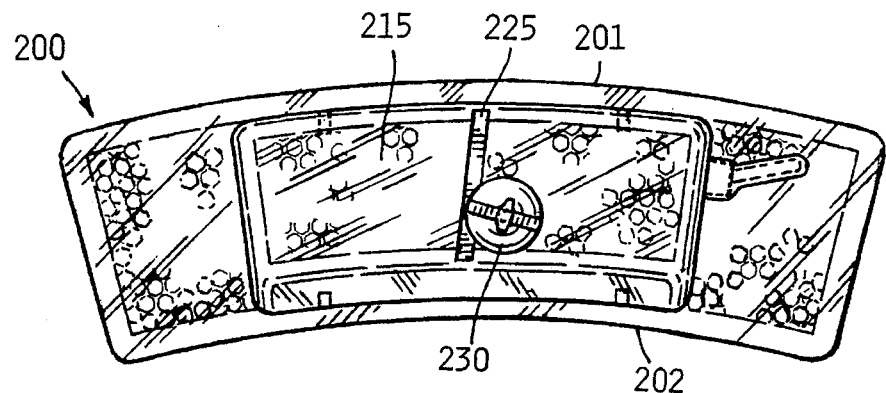
FIG. 9 is a front view of the alternative embodiment of the illuminated reflector according to the invention.
Figure 10:
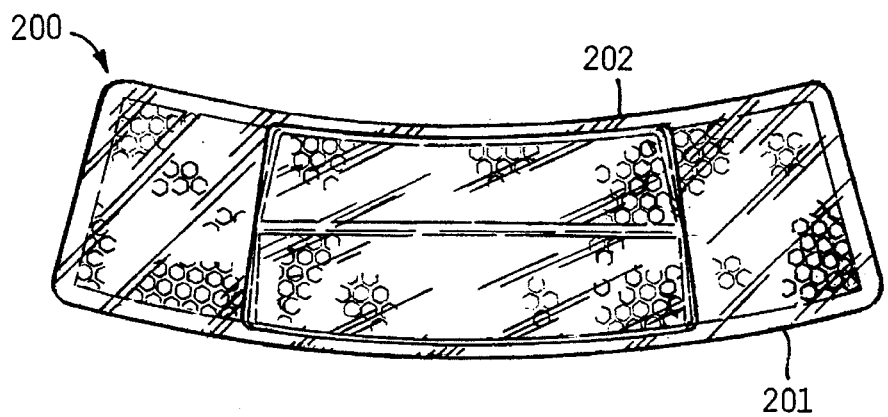
FIG. 10 is an elevational rear view of an illuminated reflector according to the alternative embodiment.

An alternative embodiment of the illuminated reflector according to the invention is shown in FIGS. 9–14. FIGS. 9 and 10 show front and rear views of the illuminated reflector 200 according to this alternative embodiment. As can be seen from those Figs., the illuminated reflector 200 has the same overall shape as the previous embodiment, with curved upper (201) and lower (202) surfaces to match the curvature of the wheel to which the bike light would be attached.

Figure 11:
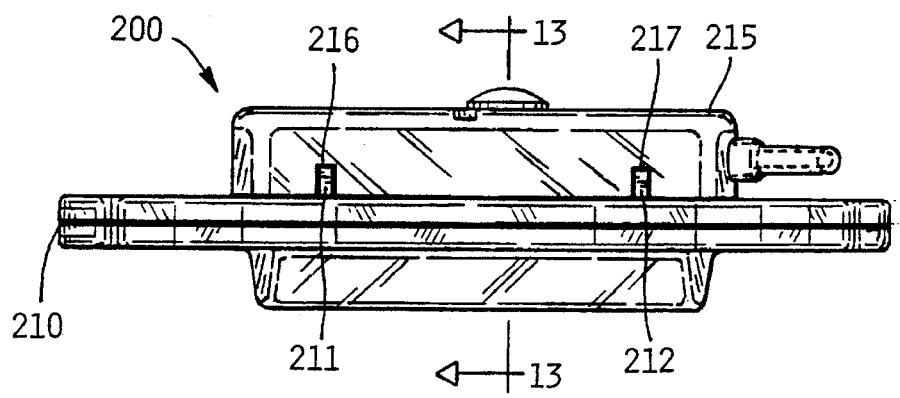
FIG. 11 is an elevational top view of the illuminated reflector according to the alternative embodiment.

Turning to FIG. 11, a top view of the illuminated reflector 200 is shown. As we will describe in greater detail below, illuminated reflector 200 includes a main housing designated as 210 and an upper or minor housing 215. Upper housing 215 is selectively attached to main housing 210 by complemental engaging means, illustratively in the form of upper housing 215 including grooves 216, 217 which receive detents 211, 212 on the main housing 210. Thus, upper housing 215 can be snap-fit onto main housing 210. Returning to FIG. 9, it can be seen that the upper housing 215 includes a spoke-receiving groove 225. A screw 230 is also received in the upper housing 215. Groove 225 and screw 230 cooperate to maintain the upper housing 215, and thus the remainder of the illuminated reflector 200, on the spoke of the bicycle wheel.

Figure 12:
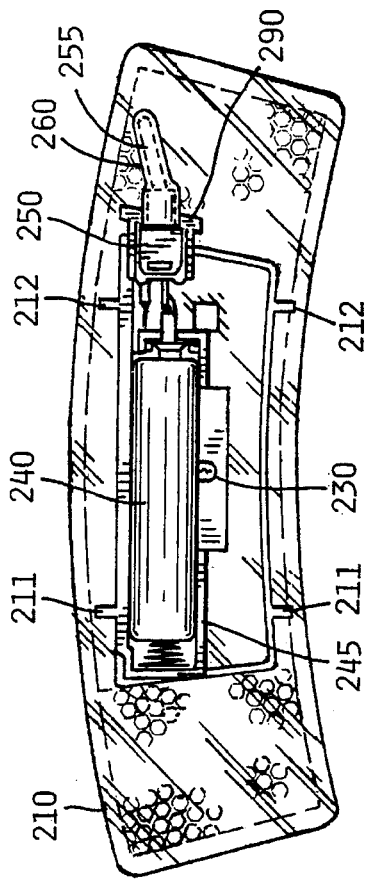
FIG. 12 is a front view of the illuminated reflector according to the alternative embodiment, with the upper housing removed.

FIG. 12 shows a view of the main housing 210, but with the upper housing 215 removed. Received within the main housing 210 are the electrical components for illuminating the illuminated reflector 200. Included among these are the fiber-optic light bulb 230 a battery 240 (illustratively "AAA") received within a battery holder 245. A sealed switch 250 is also disposed in the main housing, and is connected in series between the battery 240 and the light 230. The actuating post 255 of the switch is covered with a plastic sleeve 260 which seals the switch against water or other contaminants that may be thrown onto the light by the motion of the bicycle.

Figure 13:
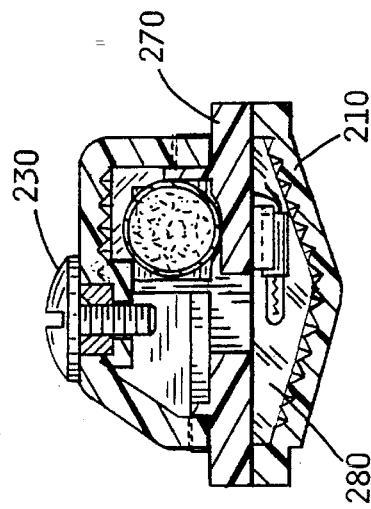
FIG. 13 is a sectional view of the illuminated reflector according to the alternative embodiment taken along the section line shown in FIG. 11.

As seen most clearly in FIG. 13, the electrical components, including light bulb 230, battery 240 and holder 245, and switch 250 may all be received on an insert member designated in FIG. 13 by reference numeral 270. The insert member 270 can then be attached to main housing 210 by an adhesive means, such as by heat staking. As can be seen by consideration of FIG. 13 in combination with FIG. 11, main housing 210 includes a central cavity 280 over which the insert member 270 is attached. This structure is advantageous since the electrical components can be independently attached to the insert member 270, and the insert member 270 then attached to main housing 210 to complete that structure. As can be seen from FIG. 12, the insert member 270 may illustratively include a bracket 290 for receiving the sealed switch 250. Further, the detents 211, 212 for engagement with the grooves 216, 217 on the upper housing 215, may be provided on insert member 270, as in FIG. 12.

The assembled combination of insert member 270 and main housing 210 forms a single assembly which is separable from upper housing 215. As mentioned above, the upper housing 215 is independently mountable to the spokes of the bicycle by means of spoke receiving groove 225 and screw 230. Accordingly, upon malfunction of electrical components of the light, or upon de-energizing of the battery, the main housing 210 along with the attached insert member 270 can be separated from the upper housing 215, which remains in place on the bicycle. Once the electrical problem has been solved, or the battery replaced, the main housing and attached insert member 270 are then re-attached to the upper housing still in place on the bicycle. This facilitates any necessary repair and/or battery changing for the illuminated reflector according to this embodiment.

Figure 14:
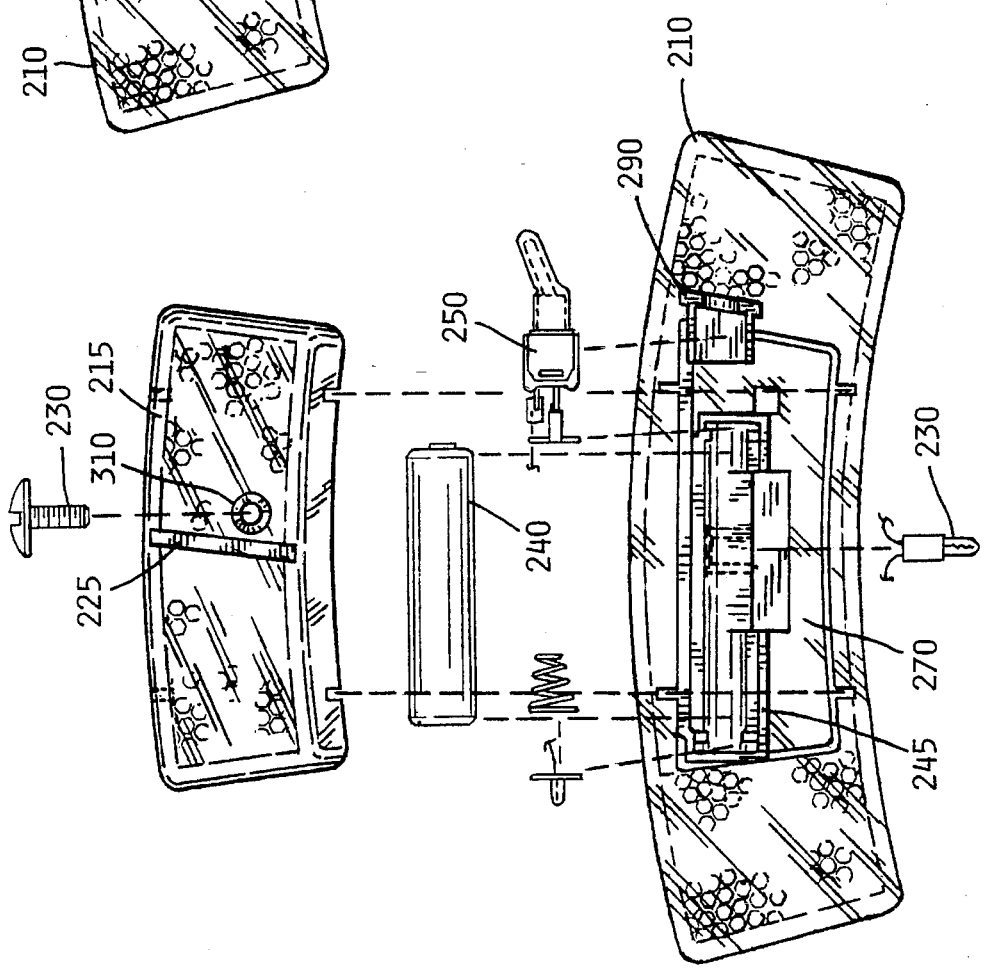
FIG. 14 is an exploded view of the illuminated reflector according to the alternative embodiment.

To provide for such this easy disassembly/re-assembly function, the upper housing 215 includes a threaded hole 310, referred to in FIG. 14. The threaded hole 310 eliminates the need for a separate nut member as was required in the previous embodiment. Further, because of the design of the bike light according to this embodiment, screw 230 need not extend through the entire body of the bike light, thus making design and manufacture of the light more simple.

The exploded view of FIG. 14 shows the various components of the bike light 200, but with the insert member 270 already attached.

There has thus been shown an illuminated reflector, which has the functional advantage of providing for constant illumination regardless of the ambient light conditions, for a bicycle rider. While performing this desirable function, the bike light is both compact and self-contained, with no external parts or wiring required. Moreover, it has a low profile and is light-weight to prevent it from adversely affecting the function of the bicycle. Finally, it is simple both to manufacture and for the user to assemble in place on a bicycle.

What is claimed is:

1. An illuminated reflector device for mounting to a spoke of a wheel, comprising in combination:

a main housing including a centrally disposed cavity;

an insert member attached to said main housing over the centrally disposed cavity, a light bulb mounted to the insert member;

a battery holder formed in the insert member, the battery holder being electrically connected to the light bulb, and being adapted to receive a battery for providing current to the light bulb;

a sealed switch mounted to the insert member, and connected between the battery and the light bulb to provide selective illumination of the light bulb;

the insert member being adapted to receive the light bulb, the battery holder and the sealed switch; and an upper housing removably secured to the main housing and attached insert member, the upper housing including a spoke-receiving groove and a screw receivable in a threaded hole for independently securing the upper housing to the spoke of a wheel.

2. The illuminated reflector of claim 1, wherein the main housing is arcuate in shape.

3. The illuminated reflector of claim 1, wherein the insert member is adhesively attached to the main housing.

4. The illuminated reflector of claim 1, wherein the insert member is heat staked to the main housing.

5. The illuminated reflector of claim 1, wherein the insert member includes a bracket for receiving the sealed switch.

6. The illuminated reflector of claim 1, wherein the upper housing and the attached main housing member and insert member include complemental engaging means.

7. The illuminated reflector of claim 6, wherein the complemental engaging means comprises detents formed on the insert member, and complemental grooves formed in the upper housing.

8. The illuminated reflector of claim 1, wherein the sealed switch includes a manual actuation member extending beyond the upper housing for selective manual actuation of the light bulb.

\* \* \* \* \*